United States Patent [19]
Calabria et al.

[11] Patent Number: 5,733,428
[45] Date of Patent: Mar. 31, 1998

[54] METHOD FOR FORMING POLYURETHANE COVER ON GOLF BALL CORE

[75] Inventors: John Calabria, Fairhaven; Dean A. Snell; Shenshen Wu, both of North Dartmouth, all of Mass.

[73] Assignee: Acushnet Company, Fairhaven, Mass.

[21] Appl. No.: 432,657

[22] Filed: May 2, 1995

Related U.S. Application Data

[63] Continuation of Ser. No. 185,667, Jan. 21, 1994, abandoned, which is a continuation-in-part of Ser. No. 909,543, Jul. 6, 1992, abandoned.

[51] Int. Cl.⁶ .................................................. B29C 00/00
[52] U.S. Cl. ........................ 264/134; 264/254; 264/271.1
[58] Field of Search ........................... 264/250, 254, 264/255, 259, 275, 278, 277, 271.1, 299, 510, 511, 134

[56] References Cited

U.S. PATENT DOCUMENTS

| | | | |
|---|---|---|---|
| 3,147,324 | 9/1964 | Ward | 264/254 |
| 3,177,280 | 4/1965 | Ford et al. | 264/275 |
| 3,616,101 | 10/1971 | Satchell et al. | 264/302 |
| 3,989,568 | 11/1976 | Isaac | 156/182 |
| 4,203,941 | 5/1980 | Brooker | 264/250 |
| 4,959,000 | 9/1990 | Gize | 425/116 |
| 5,006,288 | 4/1991 | Rhodes, Jr. et al. | 264/275 |
| 5,006,297 | 4/1991 | Brown et al. | 264/234 |
| 5,112,556 | 5/1992 | Miller et al. | 264/279 |

*Primary Examiner*—Angela Y. Ortiz
*Attorney, Agent, or Firm*—Pennie & Edmonds LLP

[57] ABSTRACT

A method and apparatus for making a golf ball of selected instruction having an encapsulated core or a non-treated core and a polyurethane cover of selected composition in which equipment is employed for aligning, centering and locating the core in relationship with the molding of the cover thereon.

16 Claims, 16 Drawing Sheets

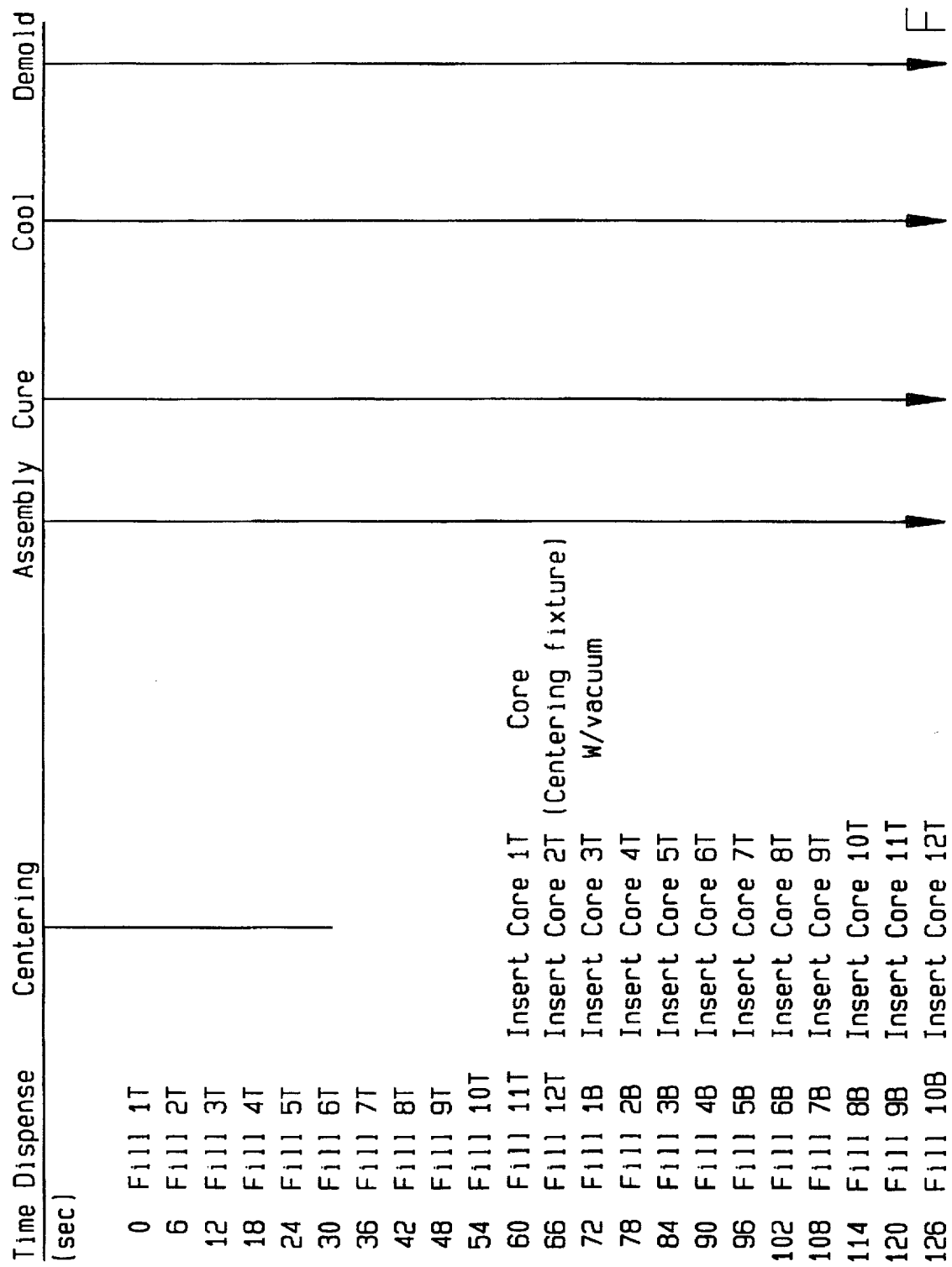

METHOD FOR FORMING POLYURETHANE COVER ON GOLF BALL CORE

This is a continuation of application Ser. No. 08/185,667, filed Jan. 21, 1994, now abandoned, which is a continuation-in-part application of Ser. No. 07/909,543, filed Jul. 6, 1992, now abandoned.

BACKGROUND OF THE INVENTION

The use of urethane polymers has been proposed for golf ball cover compositions. One patent teaches initially forming two urethane shell blanks from which cover halves are made (U.S. Pat. No. 3,989,568). Another patent suggests forming a smooth cover and thereafter impressing dimples in the smooth cover (U.S. Pat. No. 5,006,297). Still another patent describes a sequence of filling first half of a mold with urethane, inserting a ball center therein and later adding more urethane to a second half and uniting the second with the first half (U.S. Pat. No. 3,147,324).

SUMMARY OF THE INVENTION

Broadly, the present invention is a method and apparatus for making a golf ball comprising treating a core as described herein, placing a polyurethane cover of selected composition thereon in which the treated core is positioned in a mold using a controlled alignment device for centering the core during cover formation.

BRIEF DESCRIPTION OF THE DRAWINGS

FIGS. 10a and 10b are tables of process steps in a timed sequence;

DESCRIPTION OF THE PREFERRED EMBODIMENT

Figure 1:
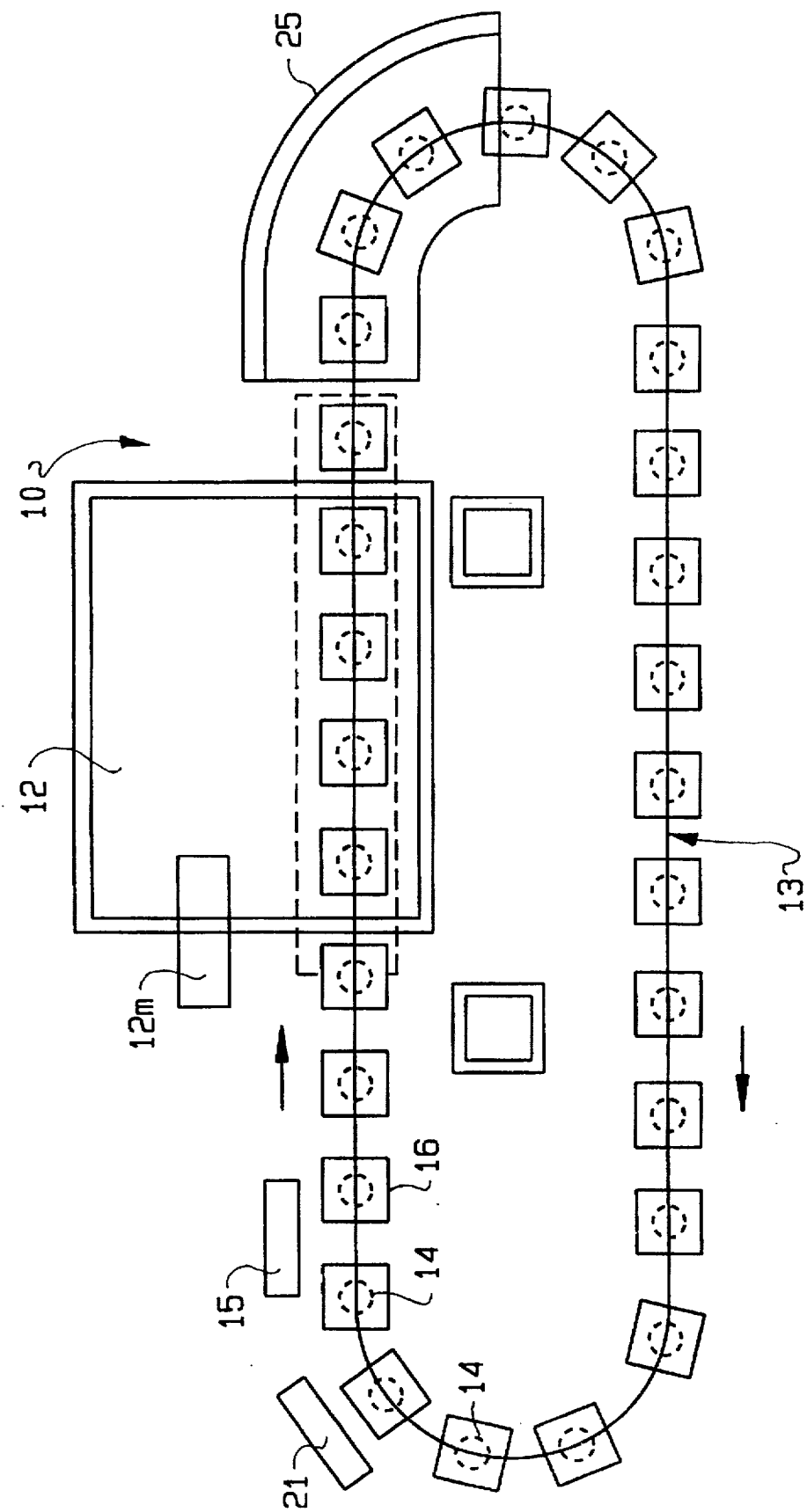
FIG. 1 is plan view of the core treating apparatus.
Figure 2:
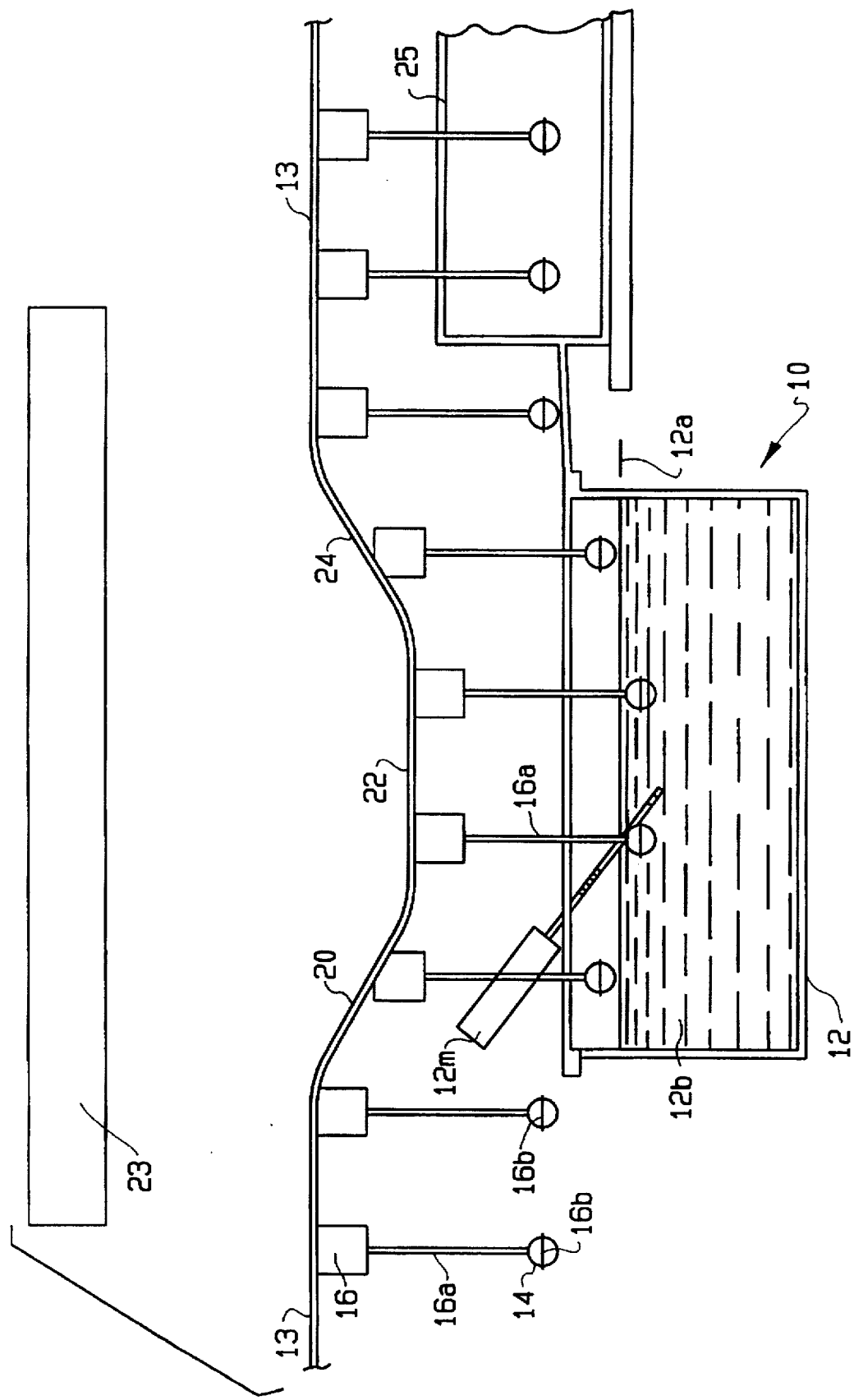
FIG. 2 is an elevational view of such apparatus.

Turning to the Figures, and in particular to FIGS. 1 and 2, dipping apparatus 10 includes a dip tank 12 filled to level 12a and agitated by electric mixer 12m. Apparatus 10 also includes oval conveying rack 13 with ball core carriers 16. Dip tank 12 is filled with latex bath 12b to level 12a and, if latex has been in tank 12 for a substantial length of time, initial mixing of bath 12b in tank 12 should be carried out until uniformity of bath 12b is reached. After such mixing golf ball cores 14 are loaded at loading station 15 into holding carriers 16 each comprising a stem 16a and a holder ring 16b. During normal operation tank 12 is agitated by electric mixer 12m. Loaded carriers 16 are carried by conveying rack 13 along and down to dip cores 14 for 1 to 60 seconds into latex bath 12b. Rack 13 moves through a descending portion 20, dipping portion 22 and ascending portion 24 of the carrier circuit to accomplish the latex dip core treatment. In wound cores the latex encapsulates the core with penetrate to a depth of about 0.050 inch and in solid cores the latex forms an encapsulating coating on the core of 0.001–0.010 inches thick.

After the ball cores 14 exit dip tank 12, they pass into a curing chamber 25 in which heat, ultraviolet rays, or other means for accelerating cure may be applied. It will be understood that some latex bath materials cure sufficiently under ambient conditions that curing chamber 25 is not required. Cores are unloaded at unload station 21.

In accordance with this invention, wound cores 14 preferably are latex dipped while dipping of solid cores 14 is optional. Depending on the nature of the latex material applied, the golf ball dip-treated cores 14 can then be stored for a period of time for additional cure, or, if the latex material is sufficiently cured at this point, the wound cores with the latex dip encapsulate can be transported directly to the molding area for molding of the cover material.

Since the latex material generates low levels of ammonia fumes in the dip tank 12, it is preferred to have a vacuum hood 23 positioned above the dip tank 12. The vacuum hood 23 is preferably provided with means (not shown) for generating a clean air curtain about the periphery of the dip tank 12 to prevent escape of undesirable gasses. The curing chamber 25 can also be provided with suitable gas removal means.

As described above, the initial step of the process of the present invention is the dipping of the core in a latex bath. The preferred core is a wound core but any core, molded or wound, may be treated by the present process. With a molded core the advantage of such latex dip treatment is the increased velocity attainable to golf balls made with such cores. With a wound core the advantages are increased velocity, reduction of flow of air into the cover material during cover formation and prevention of rubber strand unravelling.

It is important that a thermosetting, not a thermoplastic, latex be employed so that the arrangement of the cover material to the core encapsulated will not soften the encapsulating envelope and permit air to pass through it into the interstices in the windings of the wound core or allow the rubber strands to unravel.

The thermosetting latex materials which are useful in the present invention are any materials which will withstand the temperatures at which the cover material is to be applied. This temperature will, of course, depend upon the particular fluidization temperature of the selected cover material. Typical thermosetting latex materials which can be used are: low ammonia, natural latex or pre-vulcanized natural latex with or without penetrant. When using a polyurethane cover material, it has been found that pre-vulcanized natural latex is particularly suitable.

The preferred latex material, Heveatex brand Model H1704 pre-vulcanized natural latex, is a partially pre-vulcanized material which has a 60%–30% water dilution solids content. The preferred penetrant material is Niaproof #4 (tetra decyl sulfate) sold by Niacet Corp. It is understood that non-latex encapsulating materials may also be used.

After latex coating, the cover is formed around the coated core by mixing and introducing the material in mold halves. Once mixed, an exothermic reaction commences and continues. It is important that the viscosity be measured over time, so that the subsequent steps of filling each mold half, introducing the core into one half and closing the mold can be properly timed for accomplishing centering of the core cover halves fusion and achieving overall uniformity.

Figure 8:
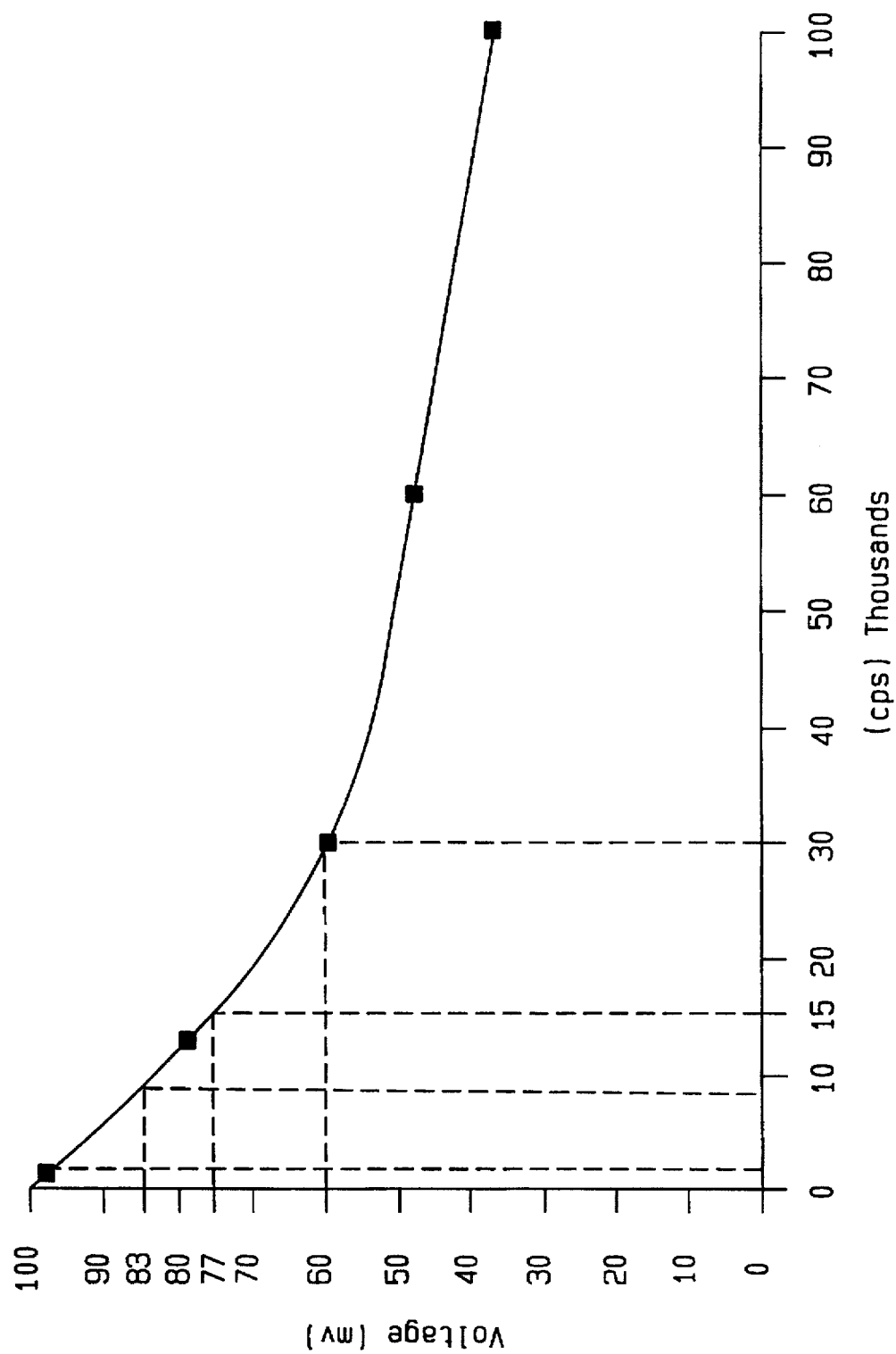
FIG. 8 is a graph plotting voltage vs. cps.
Figure 9:
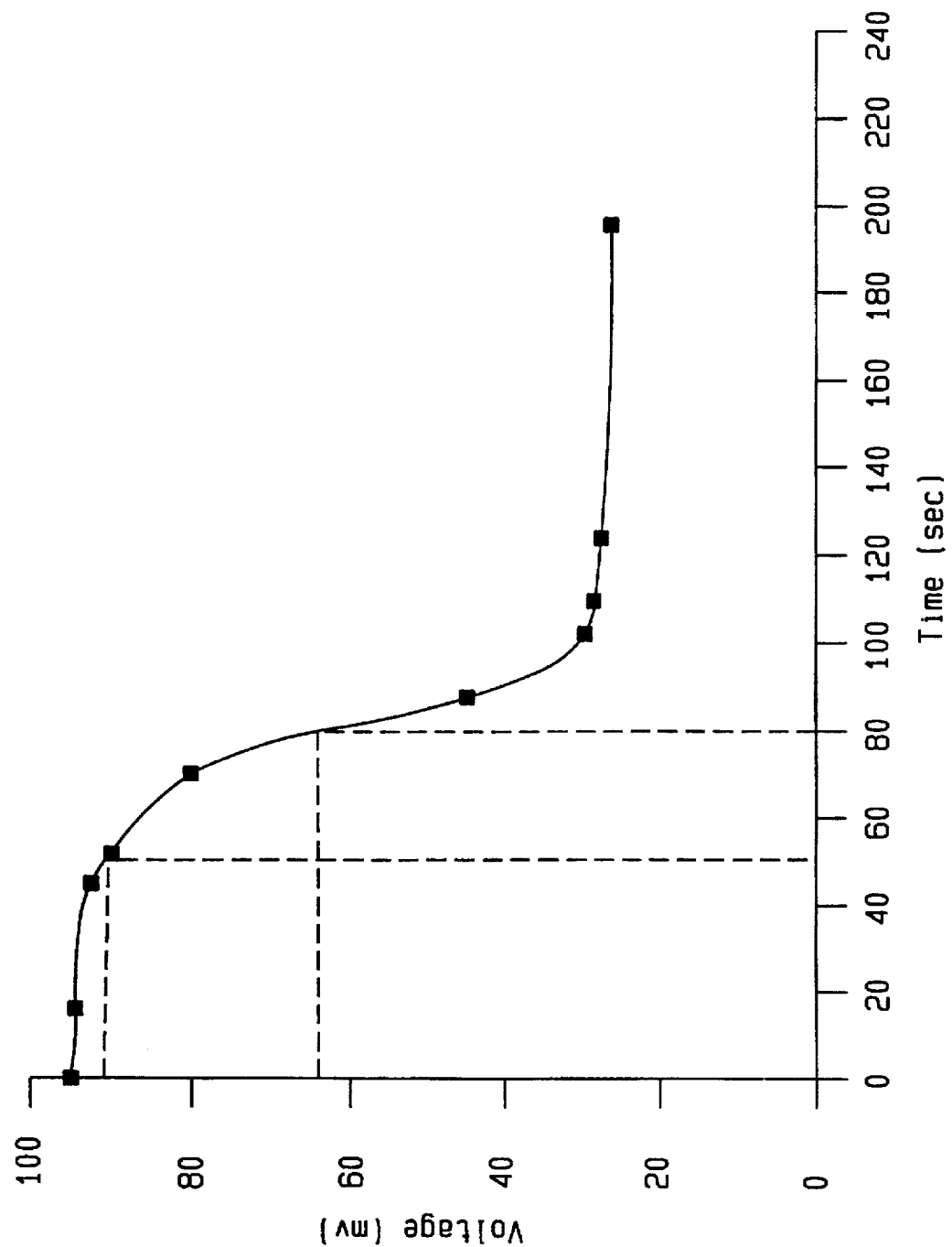
FIG. 9 is a graph plotting voltage vs. time.

The increase in the viscosity of the urethane mix over time is measured by Vibrating Needle Curemeter (VNC) manufactured by Rapra Technology Limited. It is achieved by suspending a steel needle in the curing formulation. The needle is vibrated vertically by a small electrodynamic vibrator driven by a signal generator. Resistance to its movement is ultimately recorded as the voltage output. Suitable viscosity range of the curing urethane mix for introducing cores 14 into the mold halves 51, 59 is determined to be approximately between 2,000 cps–30,000 cps or between 60 mv–98 mv voltage output with the preferred range of 8,000 to 15,000 cps (see FIG. 8). The time (gel time) at which the desired viscosity range occurs for mold mating is measured from first introduction of mix into the top half mold 51a.

The dip coating of latex penetrates the interstices, crevices and openings between the wound core threads to a depth of a fraction of an inch preferable about 0.050 inches and, as solidified, prevents a substantial quantity of air from flowing from the interior of the core into the cover during its formation. A negligible amount of the latex remains on the outside of the wound core. With solid cores about 0.001–0.010 inches is coated on the surface thus reducing the cover thickness by that amount. Small amounts of air passing through or around the latex coating are not large enough to create noticeable imperfections in the cover as determined by visual inspection.

Figure 3:
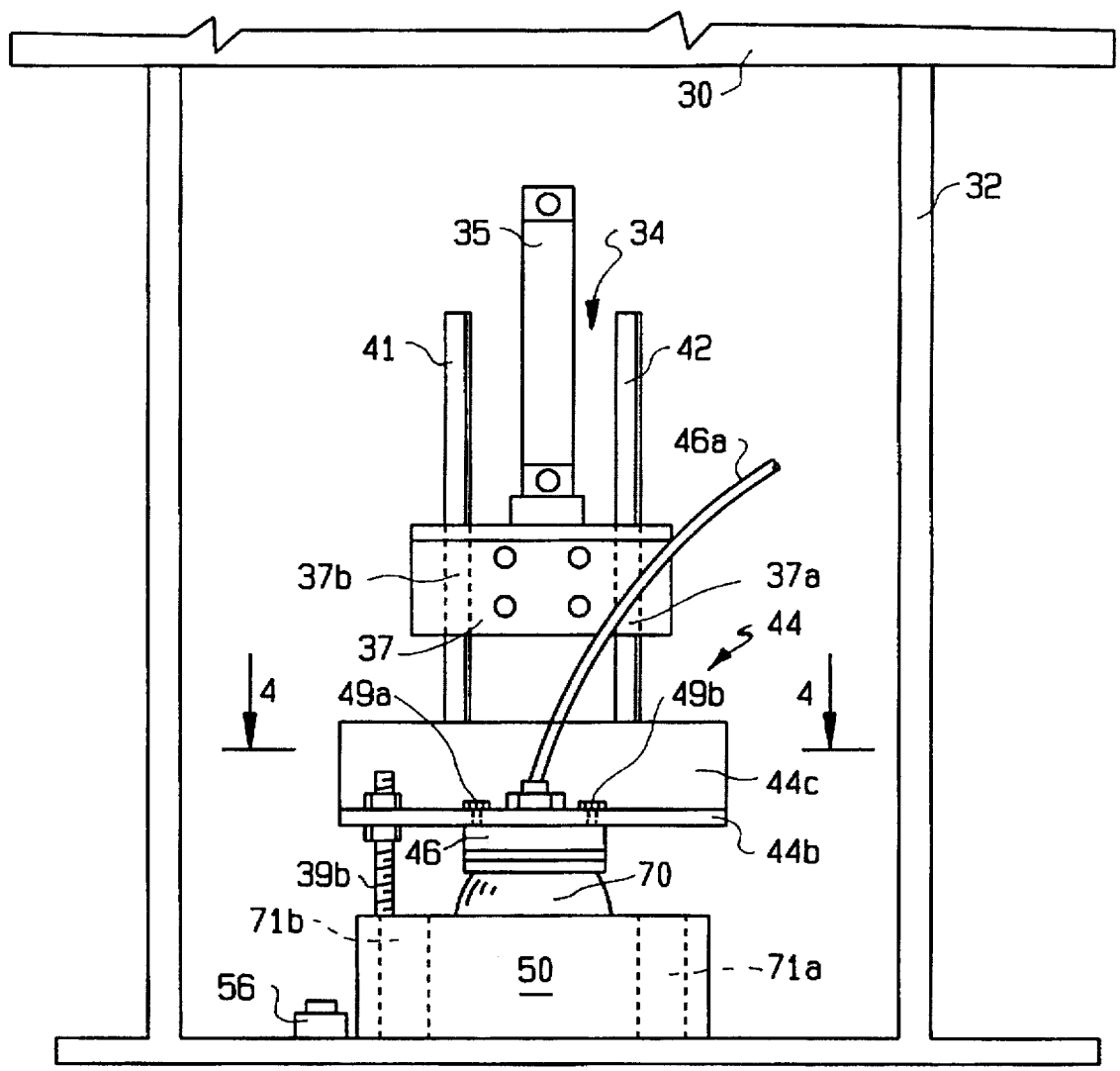
FIG. 3 is an elevational view of alignable device for placing a treated core in a mold half.
Figure 3A:
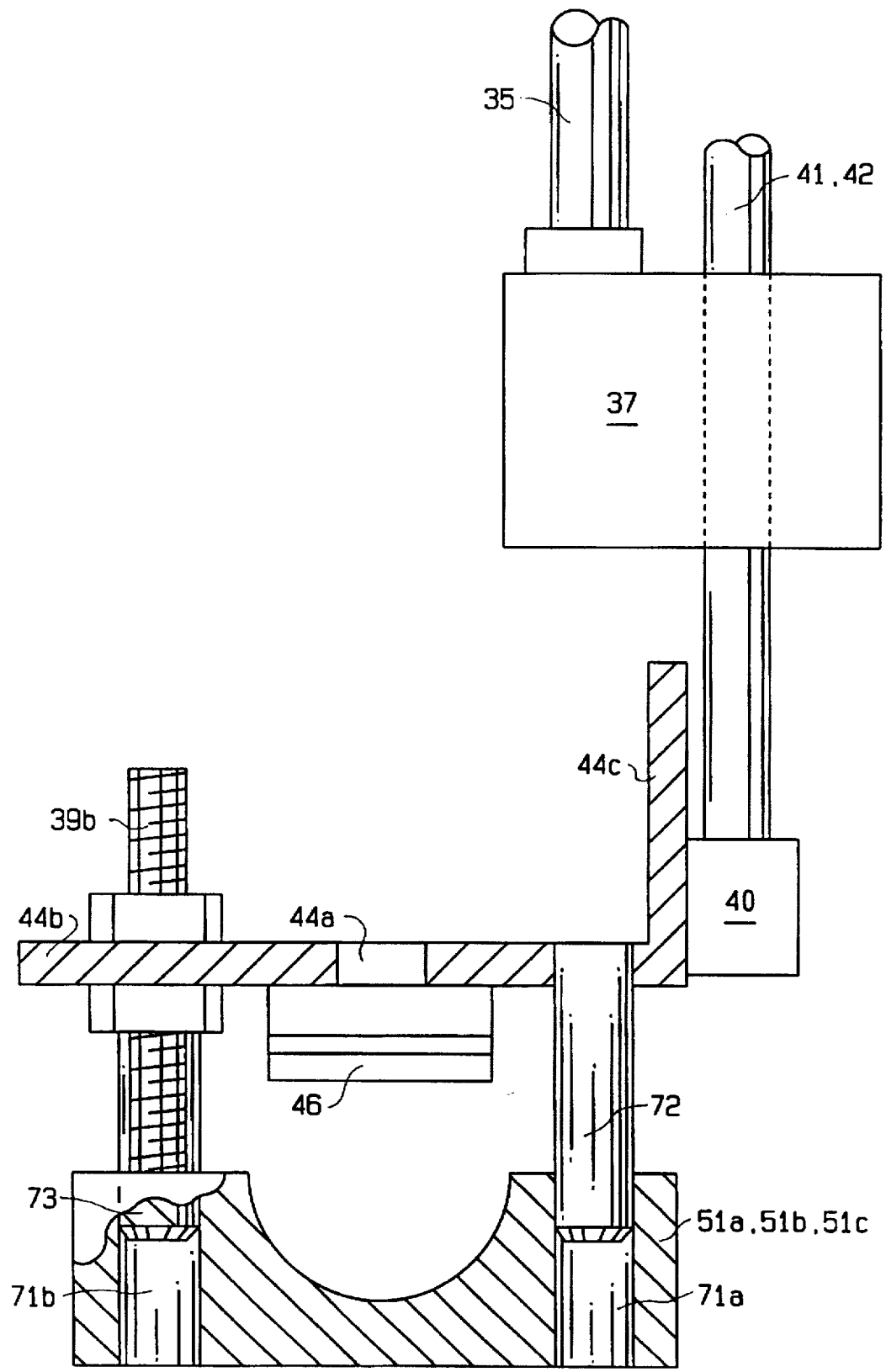
FIG. 3a is a partial side elevational view of the alignable device.
Figure 4:
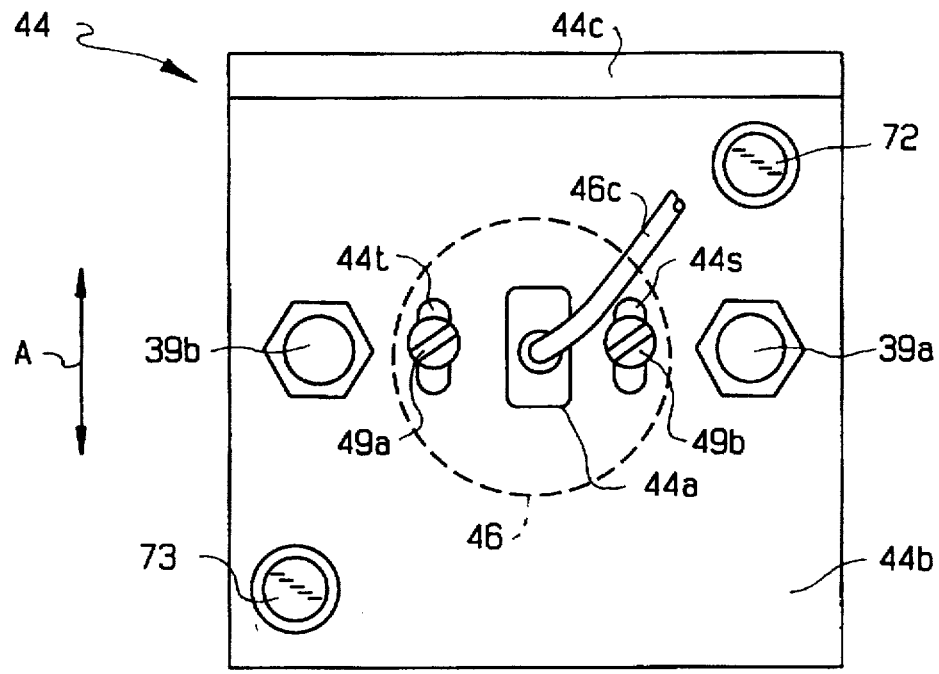
FIG. 4 is a sectional view along line 4—4 of FIG. 3.

Turning to FIG. 3 and 3a, another step of the process is the formation of the cover on the wound core 12. To accomplish this step a centering fixture is used. Fixture unit 30 includes box frame 32, stationary central guide mount 34 comprising fixed cylinder 35 and stationary guide block 37. Guide block 37 has two (2) parallel passageways 37a, 37b therethrough for receiving movable rods 41, 42 in sliding vertical movement. Rods 41, 42 are fixed to slide ball cup frame unit 44, through back piece 40, which unit 44 carries ball cup 46 mounted on cup plate 44b as described (see FIG. 3a). Ball cup 46 holds ball core 14 through reduced pressure (or partial vacuum) in hose 46a. Ball cup frame unit 44 includes base plate 44b, central opening 44a and upstanding back plate 44c. Back support 40 is secured to back plate 44c. Ball cup 46 is adjustably secured to cup plate 44b through adjustable fasteners 49a, b which ride in slots 44s and 44t (FIG. 4). Cup 46 can be adjusted vis-a-vis plate 44b front and back along arrow A (FIG. 4).

Figure 7:
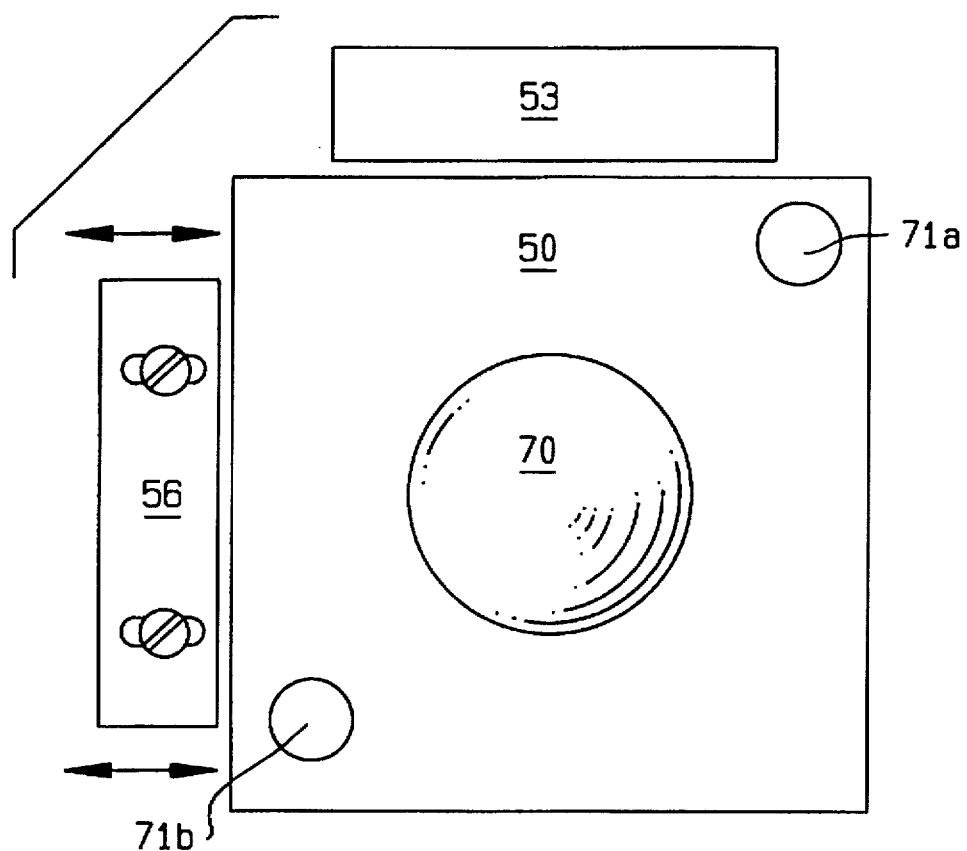
FIG. 7 shows a plan view of set-up mold.
Figure 7A:
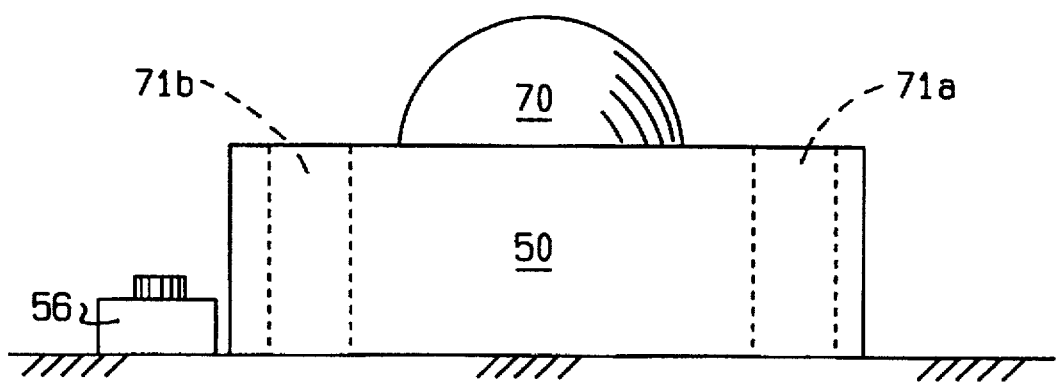
FIG. 7a shows a side view of set-up core with alignment holes.

To initially align ball core cup 46 in the proper position for molding of cover material, a machined metal set-up mold 50 is used. Set-up mold 50 is positioned by lowering unit 44 to permit pins 72, 73 to pass through alignment holes 71a, 71b in mold 50. Rails 53 and 56 serve only to assist in placing the mold 50 under unit 44 and after mold 50 is properly aligned it is spaced a few thousandths of an inch from each rail 53, 56 (FIG. 7). With ball cup 46 free through loosened fasteners 49a, b alignment of cup 46 is accomplished by lowering ball cup 46 until it sits on and contacts set-up core 70. Fasteners 49a, b are tightened when flush contact with ball cup 46 and set-up core 70 has been made. Next, mechanical stop 39b is tightened in this position. Frame unit 44 is then raised from set-up mold 50 and set-up mold 50 is removed from fixture 30.

More than one fixture unit 30 is used in the practice of this invention. With fixture unit 30 so aligned, the set-up mold 50 is removed and is ready to be replaced with a ball core 14 and a series of regular mold halves 51b, 51c, etc.

The core is centered by fixture unit 30 in the top mold half, as then inverted, to a tolerance of about 0.010 of an inch. Such tolerance is described by determining the theoretical center of the core in the mold half and tolerating the actual core center, as fixtured, to be located up to 0.005 of an inch in any direction for the theoretical center. Since the actual center is tolerated to move 0.005 inch in any direction from the theoretical center, it can move over a range of 0.010 of an inch.

Figure 5:
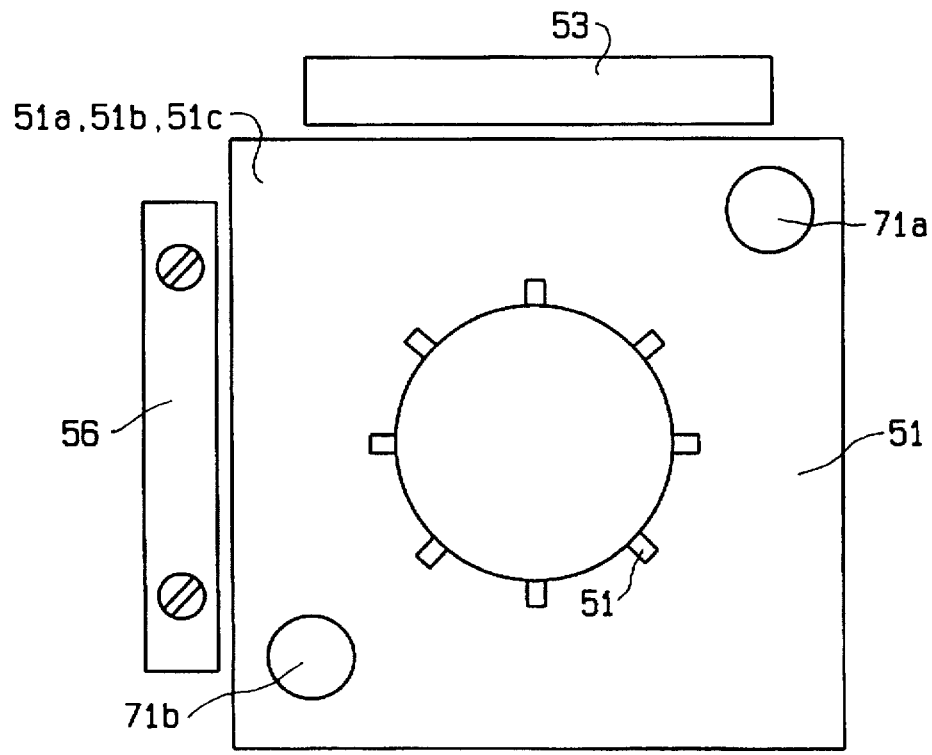
FIG. 5 is a plan view showing a mold being positioned in the alignment device.
Figure 13:
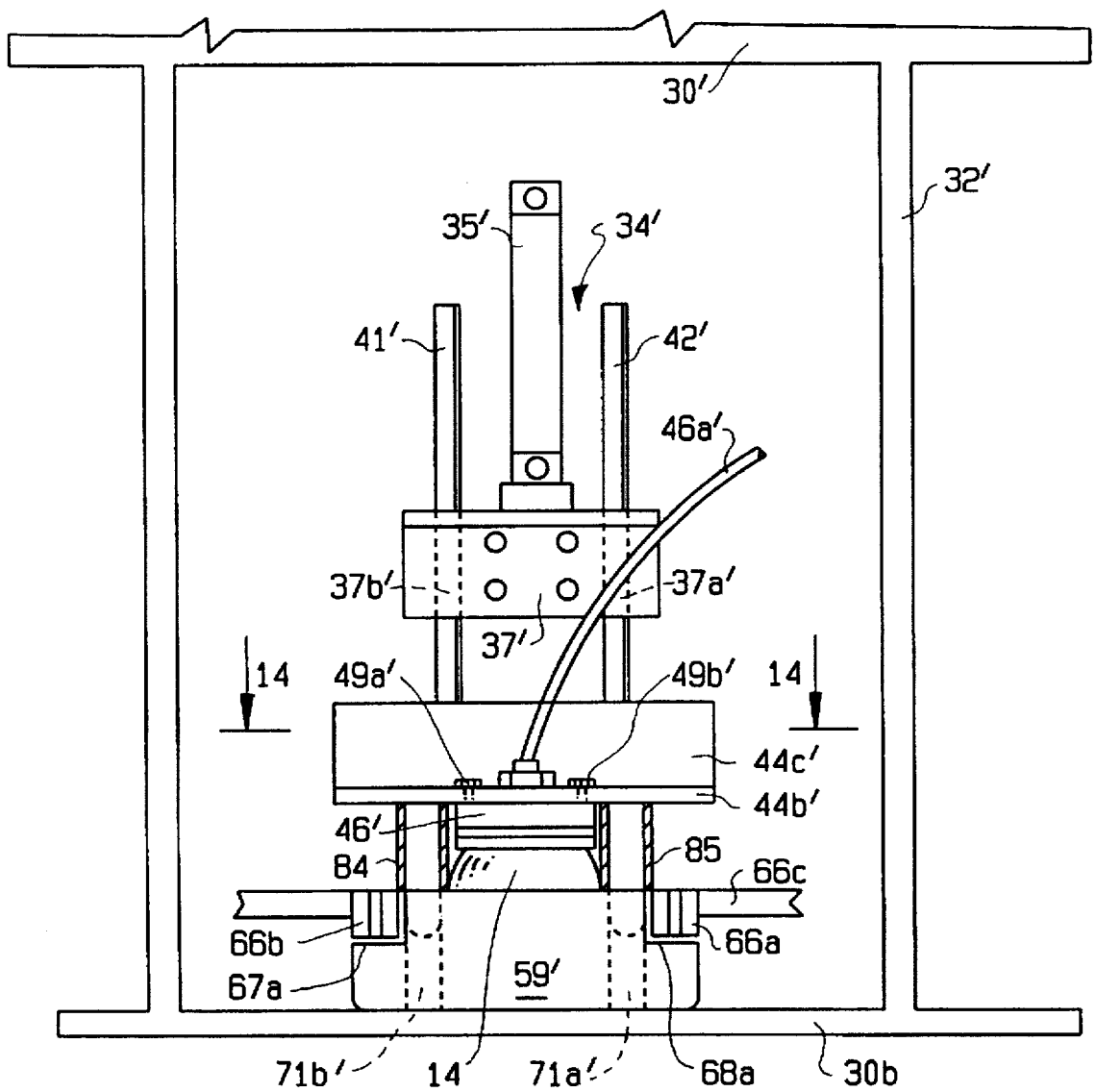
FIG. 13 is a front elevational view of an alternative embodiment of the core alignment device.
Figure 13A:
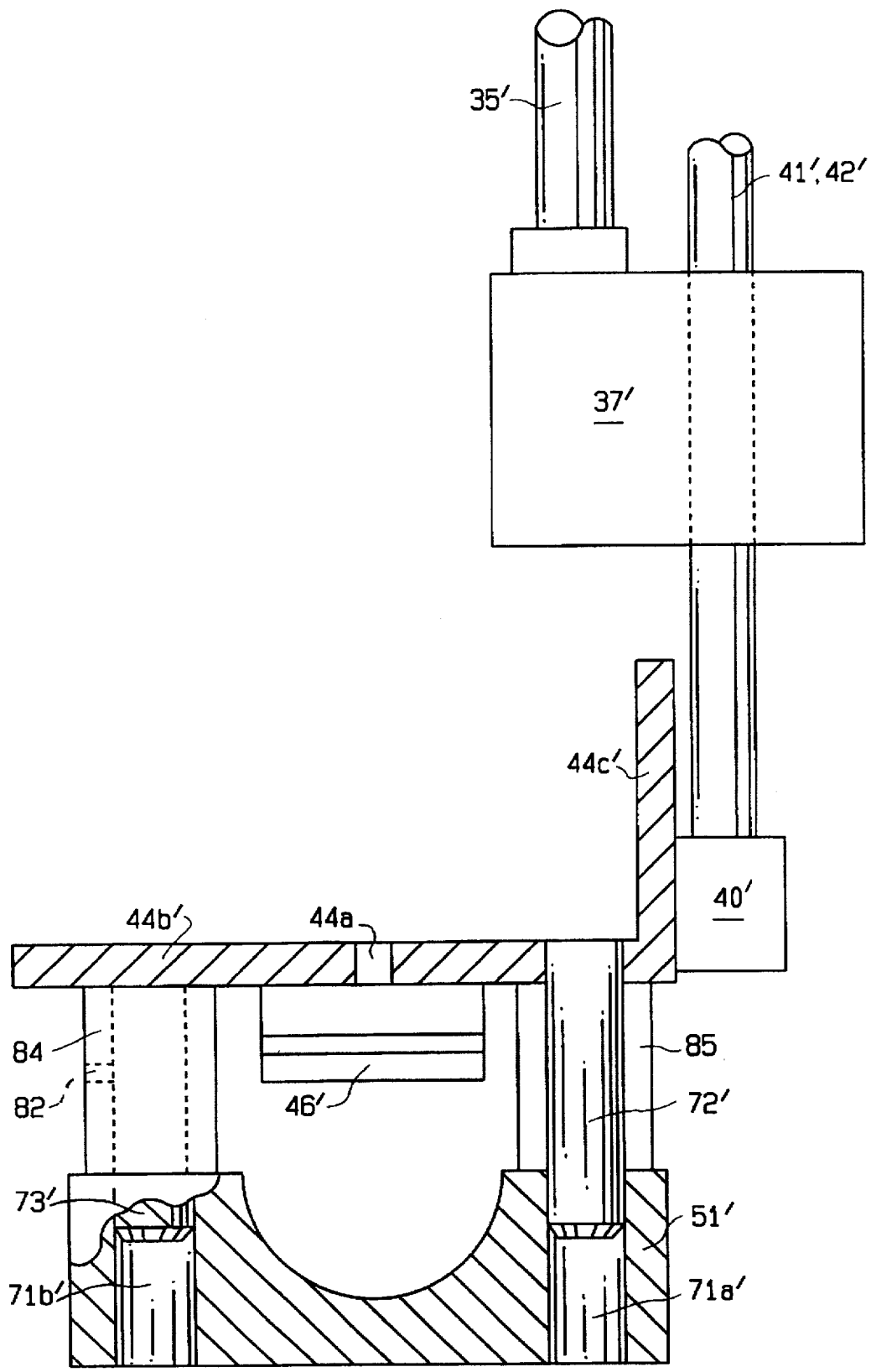
FIG. 13a is a side elevational view of the alignment device.
Figure 14:
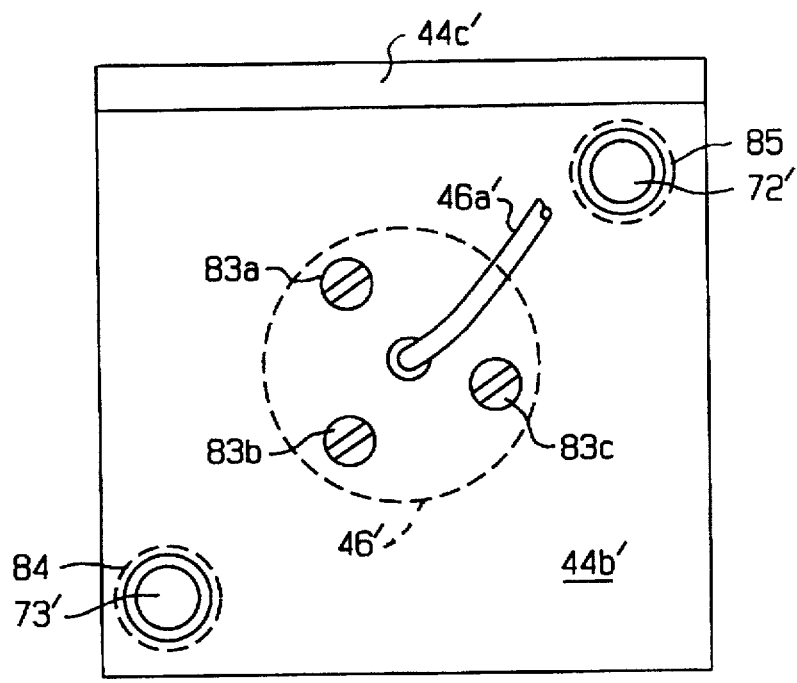
FIG. 14 is a sectional view along line 14—14 of FIG. 3.
Figure 15:
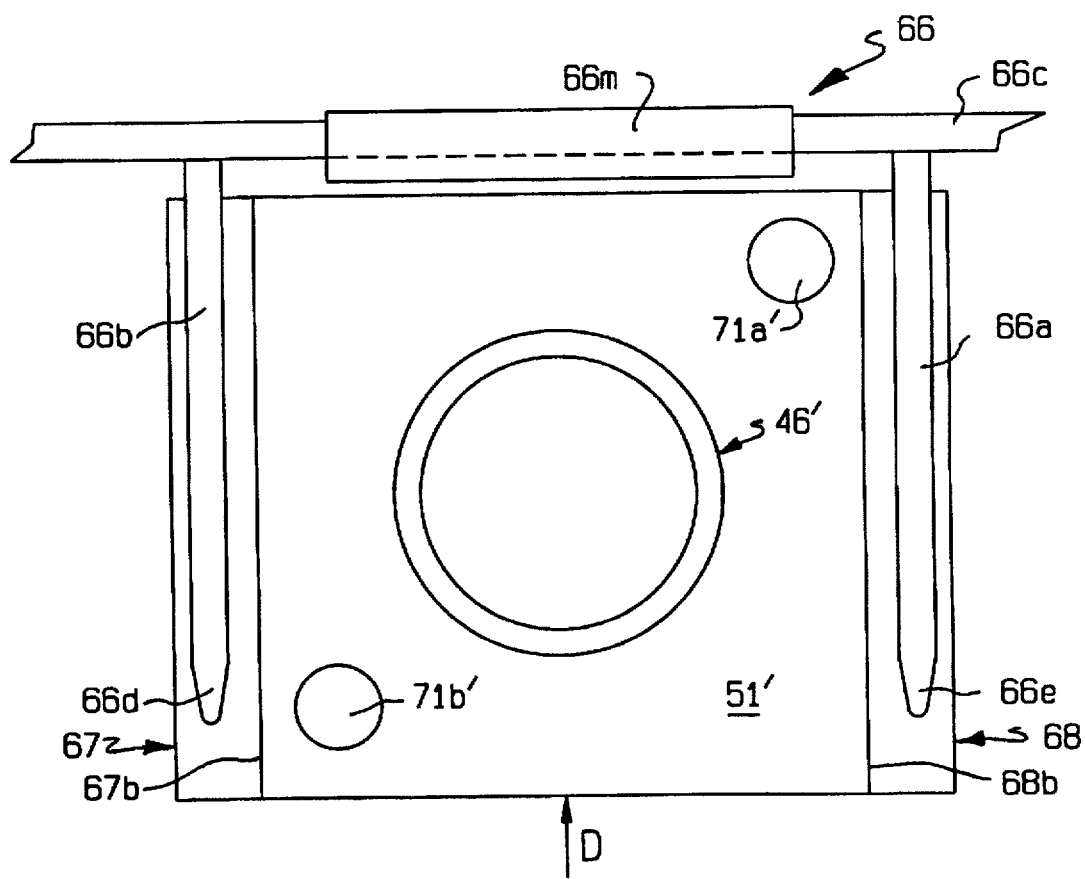
FIG. 15 is a plan view of a mold half with a horizontal aligning rail unit.

Turning to FIGS. 13–15, prime numbered elements correspond to elements on FIGS. 3–5. This alternative embodiment aligns each mold half 51, 59 with respect to the fixture frame base 30b of frame 30' using a horizontal rail alignment unit 66 which includes stationary mount block 66m, positioned on fixture base 30b, a raised horizontal cross piece 66c which carries two (2) parallel alignment rails 66a, 66b having square cross sections which rails 66a, 66b lie in mold end-to-end indentations 67, 68. Each mold indentation 67 and 68 includes a horizontal wall 67a, 68a and a vertical wall 67b, 68b. Rails 66a, 66b have tapered tips 66d, 66e to assist in guiding and positioning mold halves 51', as each is slid in direction D to the position of FIG. 15. As a mold half 51' is moved back against block 66m it is aligned and the mold half 51' is thereafter accurately positioned as pins 72' and 73' engage and move, as necessary, the mold half 51' during fixture descent. The spacings between block 66m and rails 66a, 66b and mold 51 are exaggerated in FIG. 15. These tolerances are small enough to achieve the centering tolerances set out below.

Vertical position of core 14 in ball cup 46' is accomplished using machined collars 84, 85 which slip over pins 72', 73' as shown. Set screws 82 are used to hold collars 84, 85. The length of collars 84, 85 determines the distance between cup plate 44b and mold halves 51', 59' and thereafter the position of core 14 (not shown) in cup 46'. Cup 46' is not adjustable in this embodiment but is held in fixed relationship to plate 44b' with fasteners 83a–c.

As in the other fixture embodiment, core 14 can, using this embodiment, be located up to 0.005 of an inch in any direction from the theoretical center.

Prior to proceeding with cover formation regular mold halves 51b, 51c are preheated to 140°–180° F., the prepolymer is preheated and degassed at 140°–160° F. and the curative is also preheated and degassed at a temperature of 140°–160° F. As so preheated, the prepolymer and curative both have approximately viscosities of 2000 cps.

The cover material used in the present method is polyurethane which is the product of a reaction between a polyurethane prepolymer and a curing agent. The polyurethane prepolymer is a product formed by a reaction between a polyol and a diisocyanate. The curing agent is either a polyamine or glycol. A catalyst may be employed to promote the reaction between the curing agent and the polyurethane prepolymer.

Suitable polyurethane prepolymers for use in the present invention are made from a polyol, such as polyether, polyester or polylactone, and a diisocyanate. Suitable diisocyanates for use in the present invention include 4,4'-diphenylmethane diisocyanate (MDI) and 3,3'-dimethyl-4, 4'-biphenylene diisocyanate (TODI) and toluene diisocyanate (TDI).

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethyleneglycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name Polamine by Polaroid Corporation. N,N'-dialkyldiamino diphenyl methane is sold under the trade name UNILINK® by UOP.

Suitable difunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting.

Figure 6:
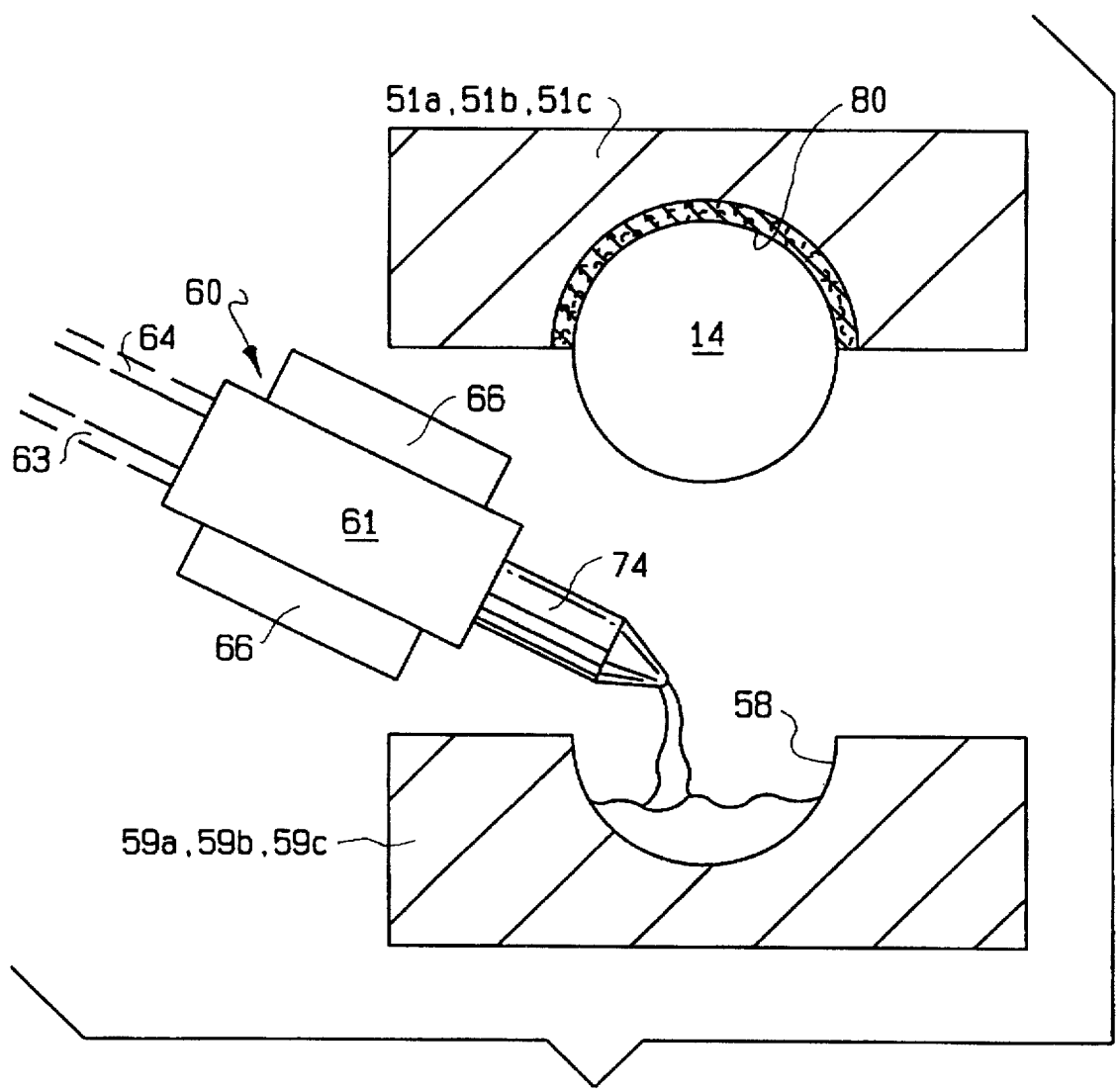
FIG. 6 shows apparatus for mixing polyurethane, dispensing it in a mold half and shows one mold half being inverted before mating with a second mold half.

To start the cover formation, mixing of the prepolymer and curative is accomplished in motorized mixer 60 (FIG. 6) including mixing head 61 by feeding through lines 63 and 64 metered amounts of curative and prepolymer. The mixer 60 is cooled by cooling jacket 66. Due to the exothermic reaction of prepolymer and curative as mixed, the mixing head temperature will tend to rise. To control such a rise, the mixing head temperature is maintained by cooling in a range appropriate for the specific urethane material and to attain a workable gel time. From the time mixing commences until the reacting material is fed into each top mold 51a, b, c, etc. or bottom mold half 59a, b, c etc. is about 4–7 seconds. Top preheated mold halves 51a, b, c etc. are filled and placed in fixture unit 30 using pins 72, 73 moving into holes 71a, 71b in each mold 51a, b, c etc. After the reacting materials have resided in top mold halves 51a, b, c. etc. for about 50–80 seconds, a core 14 is lowered at a controlled speed into the gelling reacting mixture by lowering frame unit 44 using an pneumatic powered arrangement not shown. Alternatively, electric or hydraulic systems may be used. Controlled lowering is accomplished by adjustment of the powered arrangement and by use of pneumatic controls not shown to lessen and preferably prevent air bubbles. Stop 39b limits movement downward. The amount of mixture introduced into each mold half 51a is 5.4–5.7 g. At a later time a bottom mold half 59 of a series of bottom mold halves 59a, 59b, etc. has similar mixture amounts introduced into its cavity 58 (FIG. 6).

Upon location of the coated core 14 in halves mold 51a, b, c after gelling for 50–80 seconds, the vacuum is released in line 46a allowing core 14 to be released. Mold halves 51a, b, c with core 14 and solidified cover half 80 thereon is removed from the centering fixture unit 30, inverted (see FIG. 6) and mated with other mold halves 59a, b, c which, at an appropriate time earlier have had a selected quantity of reacting polyurethane prepolymer and curing agent introduced therein to commence gelling.

When a plurality of mold halves 51a, b, c etc. and 59a, b, c etc. are filled and clamped at one time, the following time sequence is preferred.

Figure 10B:
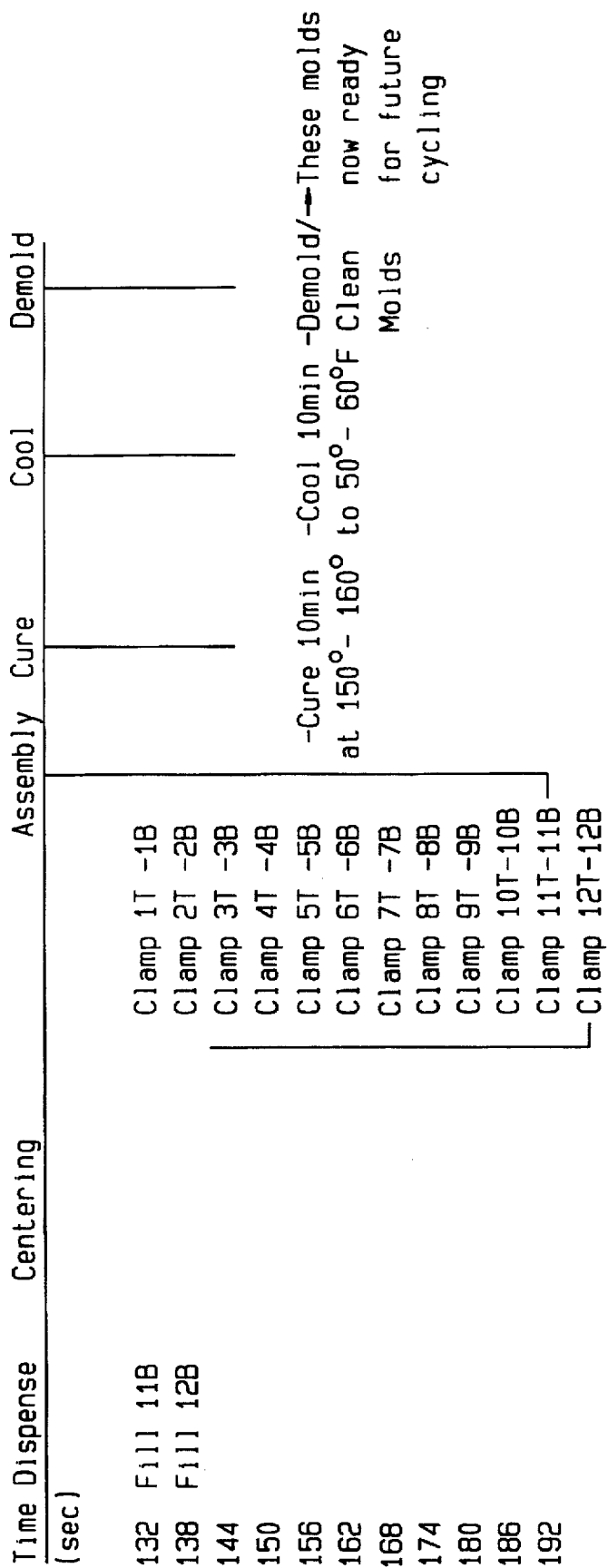

The sequence of introducing the polyurethane mix into the top mold half 51a (1T) and its mate the bottom mold half 59a (1B) is as follows: Introduction of the mixed prepolymer and curative into the top mold 51a starts the time sequence which start is referred to herein as time zero. The top half mold 51a receives the mix first at time zero and shortly mold half is placed in fixture unit 30. The core is initially inserted in the mix located in top mold 51a at time 60 seconds (see FIG. 10). At time 72 seconds, bottom mold half 59a (1B) is filled and at time 132 seconds, the mold halves 51a, 59a (1T–1B) are mated and clamped. At time 126 seconds, the mix has been in top half 51a 126 seconds and mix has been in bottom half 50a for 60 seconds. The sequence of filling other mold halves 51b (2T) and 59b (2T) and so forth follows a similar pattern. Within this sequence of mixing and dispensing of the prepolymer and curative commences at –4 to –7 seconds.

The thorough mixing that takes place in mixer 60 for the period of time described provides an improved cover material. Mold halves 51, 53 are preheated to 160°–190° F. The core is held in its fully-down position for 30–40 seconds and the vacuum is then released. Following clamping of mold halves, the clamped mold is put in a curing oven for approximately 10 minutes to reach a mold temperature of 140°–180° F. followed by cooling for approximately 10 minutes to reach a mold temperature of 50°–70° F.

The mold halves are clamped together under 400–600 psi pressure. The mold halves each contains sufficient reacting material to form hemispherical portions of the cover. Mold halves are held together for 10–15 minutes and thereafter cooled from 140°–180° F. to 50° F.–70° F. and then opened to demold the ball. Excess polyurethane is extruded from the mold cavity into sprue channels 51s forming solidified sprues not shown.

EXAMPLE I

A wound center was dipped in a 30% pre-vulcanized latex solution, drained and partially dried in a current of warm air. Remainder of drying was accomplished at room temperature. Latex penetration was approximately 50 mils. A mold half was preheated to approximately 160° F.

A mixture of 100 parts of Betathane 23.711, an MDI-based polyether prepolymer, 5.19 parts of titanium dioxide dispersion and 48.27 parts of Polamine 250 was prepared. Approximately 5.6 g of this mixture was dispensed into a heated mold cavity and allowed to thicken for approximately one minute. A dipped wound core with a diameter of 1.580" was placed in the bottom mold cavity by means of the centering fixture shown in FIG. 3. The core was held in a concentric position for approximately 40 seconds to allow the material to thicken further to support the core. The top heated mold half was then filled and the material allowed to thicken for approximately 1 minute. The top and bottom mold halves were then assembled and clamped by bolts or any conventional manner. The assembled mold was introduced into a curing oven and cured for 10 minutes at approximately 160° F. The assembled mold was then introduced into a cooling chamber for approximately 10 minutes to reach a mold temperature of 50°–70° F.

The resulting cover was approximately 50 mils thick on a side and had a Shore D durometer of approximately 58–60 when measured after a two-day waiting period. Subsequently, the ball was painted and the cover was observed to be highly abrasion and cut resistant. Spin rate of this ball was approximately 100–200 rpm lower than a balata covered ball(Tour 100) with an acceptable velocity of 252.7 ft/sec.

EXAMPLE II

The steps of Example I were carried out except that the wound core was not dipped in a latex solution.

EXAMPLE III

The steps of Example I were carried out except that a solid core was used.

EXAMPLE IV

The steps of Example I were carried out with a solid core without a latex dip.

Figure 11:
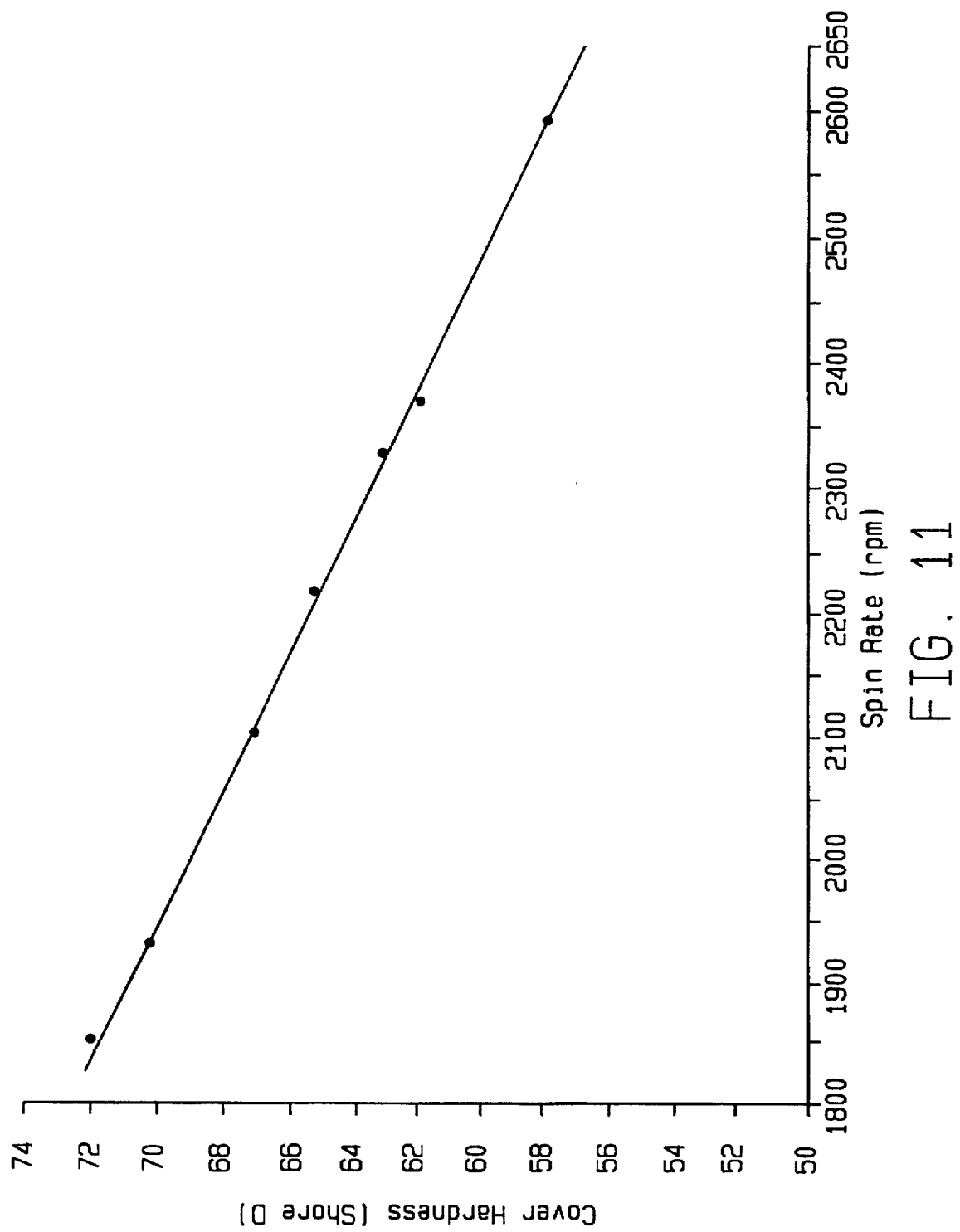
FIG. 11 is a graph plotting hardness vs. spin rate.

A range of core sizes that can be employed in this invention, whether dipped or non-dipped, is 1.560" to 1.610" was determined by previous testing that as core size of the ball increases, ball velocity increases (FIG. 11). However, if the durometer of the cover remains the same, spin rate of the ball was materially unaffected. Spin rate can be changed by modifying the durometer of the cover by selecting different ratios of materials or combining other materials. Cover durometers of 48 Shore D to 72 Shore D are attainable with the preferred range of 58–62 for this type of ball.

Figure 12:
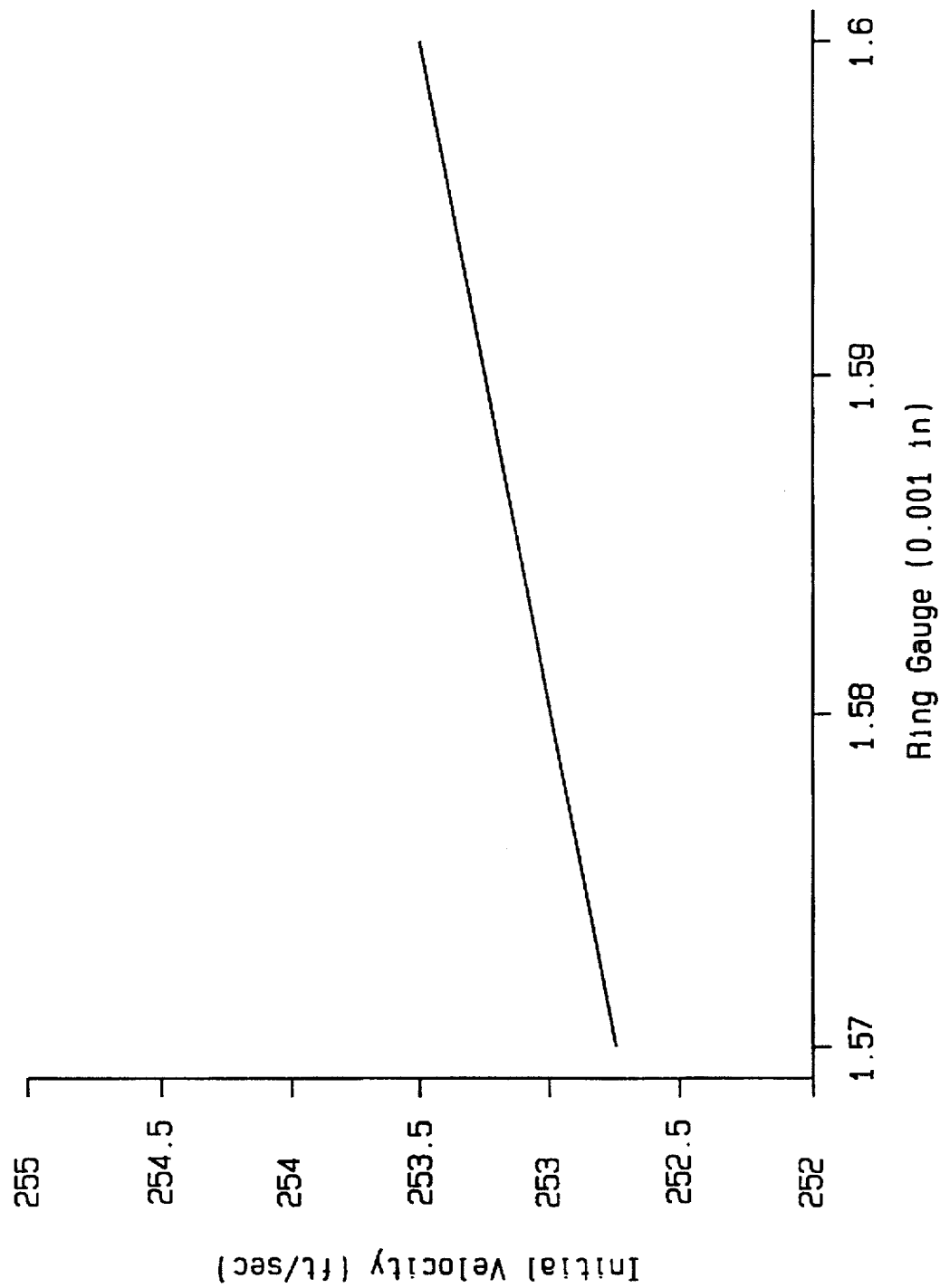
FIG. 12 is a graph plotting initial velocity vs. wound ball size.

The relationship between durometer and spin rate was determined to be linear with harder durometer covers producing lower spin rates (FIG. 12).

We claim:

1. In a method of making a golf ball using a golf ball core holder and first and second mold halves, with the first mold half positioned below the core holder, the improvement comprising
   a) placing a core in the core holder of a movable fixture, wherein the fixture comprises an adjustable mold holding unit for centering the core and receiving the first mold half and wherein the adjustable mold holding unit comprises a frame unit movably mounted relative to the first mold half for moving the core and core holder; and wherein the adjustable mold holding unit further comprises at least one stop member to limit movement of the frame unit;
   b) placing polyurethane in the first mold half and allowing said polyurethane to partially cure to a selected state of gel;
   c) causing the core holder and core to move continuously at a controlled rate toward the polyurethane in the first mold half until the core contacts the polyurethane, when the polyurethane is in said selected state of gel, and the core is centered in the first mold half;
   d) disengaging the core from the core holder after a selected period of time;
   e) placing such core with the polyurethane while still in said first mold half against a second mold half having polyurethane at a selected state of gel therein and mating the two half molds together; and
   f) curing the polyurethane in the mated halves.

2. The method of claim 1 wherein about 50 to 80 seconds are allowed to elapse between the time the polyurethane is placed into the first mold half and the time the core contacts the polyurethane in the first mold half.

3. The method of claim 1 wherein the polyurethane is a product of the reaction between a polyurethane prepolymer and a curing agent with the polyurethane prepolymer being a product formed by the reaction between a polyol and a diisocyanate.

4. The method of claim 1 wherein the core is held in its centered position in the first mold half for about 1 to 40 seconds prior to releasing the core from the core holder.

5. The method of claim 3 wherein the prepolymer is a product formed by the reaction between 4,4'diphenylmethane diisocyanate and a polyether type polyol and wherein the curing agent is polytetramethyleneoxide-di-p-aminobenzoate.

6. The method of claim 1 wherein about 50–80 seconds are allowed to elapse between the time the polyurethane is placed into the second mold half and the time the mold halves are mated.

7. The method of claim 1 wherein about 50–80 seconds are allowed to elapse between the time the polyurethane is placed into the first mold half and the time the core is released from the core holder.

8. The method of claim 1 in which the polyurethane in the first and second mold halves comprises a prepolymer and a curative and in which the polyurethane in the second mold half has cured for substantially the same length of time as the polyurethane in the first mold half when the core is placed into the first mold half.

9. The method of claim 1 in which the rate of lowering of the core in the fixture is such that substantially no air bubbles are created as the core contacts the polyurethane in the first mold half.

10. The method of claim 1 further comprising encapsulating the core with a thermosetting latex material prior to placing the core in the core holder.

11. The method of claim 10 wherein the core has been encapsulated by dipping the core in a bath containing the thermosetting latex material.

12. The method of claim 1 wherein the viscosity of the polyurethane in the first mold half is about 8,000 cps to about 30,000 cps when the core contacts the polyurethane in the first mold half.

13. The method of claim 1 wherein the mold halves are preheated to a temperature of from about 140° F. to about 180° F. prior to placing the polyurethane therein.

14. The method of claim 1 wherein the ball core holder is adjustably mounted on the frame unit and wherein the adjustable mold holding unit further comprises:
   a) a guide frame to which the frame unit is movably connected;
   b) alignment means for initially aligning the frame unit and the ball core holder prior to molding, comprising a set up mold half, mold guide rails, alignment pins and adjustment fasteners; and
   c) lowering means for controlling the descent of the frame unit and the ball core holder to control the movement of the core into the mold.

15. A method of making a golf ball using a golf ball core holder and first and second mold halves, with the first mold half positioned below the core holder, the method comprising
   a) placing a core in the core holder of a movable fixture, wherein the fixture comprises an adjustable mold holding unit for centering the core and receiving the first mold half, and wherein the first mold half defines at least one alignment aperture therein, and wherein the adjustable mold holding unit further comprises a frame unit mounted for movement relative to the first mold half for lowering the core holder and core, and wherein the frame unit comprises at least one alignment pin for engaging the alignment aperture of the first mold half and wherein the adjustable mold holding unit comprises a stop member for limiting the movement of the frame unit;

b) placing polyurethane in the first mold half and allowing said polyurethane to partially cure to a selected state of gel;

c) causing the core holder and core to move continuously at a controlled rate toward the polyurethane in the first mold half until the alignment pin engages the alignment aperture and the core contacts the polyurethane, when the polyurethane is in said selected state of gel, and the core is centered in the first mold half;

d) disengaging the core from the core holder after a selected period of time;

e) placing such core with the polyurethane while still in said first mold half against a second mold half having polyurethane at a selected state of gel therein and mating the two half molds together; and f) curing the polyurethane in the mated halves.

16. The method of claim 15 further comprising aligning the first mold half with the fixture prior to the movement of the core holder and core by causing the pin to engage the alignment aperture of the first mold half.

* * * * *